(12) United States Patent
Silvestro et al.

(10) Patent No.: US 11,603,890 B2
(45) Date of Patent: Mar. 14, 2023

(54) DRIVELINE ENGAGEMENT SYSTEM

(71) Applicant: GE Avio S.r.l., Rivalta di Torino (IT)

(72) Inventors: Lorenzo Silvestro, Turin (IT); Ivan Borra, Savigliano (IT)

(73) Assignee: GE AVIO S.R.L., Rivalta di Torino (IT)

( * ) Notice: Subject to any disclaimer, the term of this patent is extended or adjusted under 35 U.S.C. 154(b) by 190 days.

(21) Appl. No.: 17/020,204

(22) Filed: Sep. 14, 2020

(65) Prior Publication Data

US 2021/0079957 A1    Mar. 18, 2021

(30) Foreign Application Priority Data

Sep. 18, 2019   (IT) .......................... 102019000016625

(51) Int. Cl.
| | |
|---|---|
| *F16D 11/10* | (2006.01) |
| *F16D 11/00* | (2006.01) |
| *F16D 23/12* | (2006.01) |

(52) U.S. Cl.
CPC ........ *F16D 11/10* (2013.01); *F16D 2011/002* (2013.01); *F16D 2023/126* (2013.01); *F16D 2300/26* (2013.01)

(58) Field of Classification Search
CPC ............... F16D 11/10; F16D 2011/002; F16D 2023/126; F16D 2300/26; F16C 19/16; F16C 2361/61
USPC ....................................................... 192/69.9
See application file for complete search history.

(56) References Cited

U.S. PATENT DOCUMENTS

| | | | |
|---|---|---|---|
| 4,195,718 A |  | 4/1980 | Schmohe |
| 4,353,269 A |  | 10/1982 | Hiersig |
| 4,595,087 A | * | 6/1986 | Morisawa ............. F16D 25/082 192/85.18 |
| 4,796,743 A |  | 1/1989 | Hallerback |
| 5,031,740 A |  | 7/1991 | Deichstetter et al. |
| 5,052,986 A | * | 10/1991 | Jarchow .................. F16D 23/06 475/72 |
| 6,062,363 A | * | 5/2000 | Cline ...................... F16D 11/10 192/69 |
| 6,079,539 A | * | 6/2000 | Fetcho .................... F16D 11/10 192/85.53 |

(Continued)

FOREIGN PATENT DOCUMENTS

| | | |
|---|---|---|
| DE | 102017123373 A1 * | 4/2019 |
| GB | 1520046 A | 8/1978 |
| WO | 2015000811 A1 | 1/2015 |

OTHER PUBLICATIONS

Rebbechi et al., An Investigation of F/A-18 AMAD Gearbox Driveshaft Vibration, AR-010-389, Airframes and Engines Division, Aeronautical and Maritime Research Laboratory, Department of Defence, Australia, Nov. 1997, 101 Pages. http://www.dtic.mil/dtic/tr/fulltext/u2/a348040.pdf.

*Primary Examiner* — Timothy Hannon

(74) *Attorney, Agent, or Firm* — Venable LLP; Michele V. Frank

(57) ABSTRACT

A selectively connectable driveline system including a first rotatable shaft extended along a lateral direction, a second rotatable shaft extended along the lateral direction separable along the lateral direction from the first rotatable shaft, and a coupling assembly moveable along the lateral direction. The coupling assembly is connected to the first rotatable shaft and is further selectively connectable to the second rotatable shaft.

20 Claims, 7 Drawing Sheets

(56) References Cited

U.S. PATENT DOCUMENTS

| | | | |
|---|---|---|---|
| 6,598,722 B2* | 7/2003 | Pugliese | B60K 23/08 |
| | | | 192/85.11 |
| 7,918,324 B2* | 4/2011 | Tagami | F16D 11/10 |
| | | | 192/114 R |
| 7,975,796 B2* | 7/2011 | Guo | F16D 11/14 |
| | | | 180/247 |
| 9,297,422 B2 | 3/2016 | Barnett et al. | |
| 9,796,264 B2 | 10/2017 | Brault et al. | |
| 9,945,424 B2 | 4/2018 | Lin et al. | |
| 2003/0196865 A1* | 10/2003 | Lim | B60K 23/08 |
| | | | 192/84.92 |
| 2008/0022792 A1 | 1/2008 | Robinson | |
| 2015/0083540 A1* | 3/2015 | Sumek | F16D 25/061 |
| | | | 192/85.01 |
| 2017/0240290 A1 | 8/2017 | Dumur | |
| 2018/0238394 A1 | 8/2018 | Lin et al. | |
| 2018/0298827 A1 | 10/2018 | Lafargue et al. | |
| 2019/0301540 A1* | 10/2019 | Adachi | F16D 23/14 |

\* cited by examiner

DRIVELINE ENGAGEMENT SYSTEM

PRIORITY INFORMATION

The present application claims priority to Italian Patent Application Number 102019000016625 filed on Sep. 18, 2019.

FIELD

The present subject matter relates generally to connection systems for driveline components.

BACKGROUND

Gear assemblies, such as accessory gearboxes or main gearboxes for turbine engines and other torque-receiving components, may contain components that need to be maintained more frequently than other surrounding systems, components, or apparatuses. Such components, such as gear assemblies, may include line replaceable units, or LRU's, that generally require accessibility for inspection, maintenance, or repair. As such, there is a need for improved driveline connection and disconnection systems that may facilitate ease of inspection and maintenance.

BRIEF DESCRIPTION

Aspects and advantages of the invention will be set forth in part in the following description, or may be obvious from the description, or may be learned through practice of the invention.

An aspect of the present disclosure is directed to a selectively connectable driveline system including a first rotatable shaft extended along a lateral direction, a second rotatable shaft extended along the lateral direction in which the second rotatable shaft is separable or spaced apart along the lateral direction from the first rotatable shaft, and a coupling assembly moveable along the lateral direction. The coupling assembly is connected to the first rotatable shaft and is selectively connectable to the second rotatable shaft.

In various embodiments, a coupling interface is defined at the portion of the first rotatable shaft and the portion of the second rotatable shaft at which the coupling assembly is selectively connectable. In one embodiment, the coupling interface defines an engagement end at which the coupling assembly initially connects to the second rotatable shaft when selectively connected together. In one embodiment, the engagement end defines a non-flat end of the coupling interface. In another embodiment, the non-flat end of the coupling interface defines an angular end.

In one embodiment, the system further includes an actuation system connectable to the coupling assembly. The actuation system is configured to provide lateral movement to the coupling assembly in which the lateral movement is sufficient to selectively connect the coupling assembly to the first rotatable shaft and the second rotatable shaft.

In various embodiments, the system further includes a housing surrounding the coupling assembly. The housing surrounds at least a portion of the first rotatable shaft and a portion of the second rotatable shaft at which the coupling assembly is selectively connectable. In one embodiment, the housing includes a stop wall extended at least partially radially relative to the laterally extended rotatable shafts. The stop wall is positioned laterally next to the coupling assembly and is separated from the coupling assembly by a lateral distance corresponding at least to a distance sufficient to allow lateral movement of the coupling assembly to selectively connect to the first rotatable shaft and the second rotatable shaft.

In another embodiment, the stop wall of the housing includes a first stop wall positioned next to a first end of the coupling assembly and a second stop wall positioned next to a second end of the coupling assembly laterally opposite of the first end, in which a maximum lateral distance of the first stop wall and the second stop wall each correspond to a maximum lateral displacement of the coupling assembly without disengaging from both of the first rotatable shaft and the second rotatable shaft.

In still another embodiment, a minimum lateral distance of at least one of the first stop wall or the second stop wall corresponds to a minimum lateral displacement of the coupling assembly sufficient to engage both of the first rotatable shaft and the second rotatable shaft.

In still various embodiments, the coupling interface defines a geared spline. In one embodiment, the coupling interface defines a single geared spline or key joint.

Another aspect of the present disclosure is directed to an apparatus including a first component providing torque via an output shaft, a second component receiving torque via an input shaft, and a coupling assembly moveable along a lateral direction, in which the coupling assembly is connected to one of the output shaft or the input shaft and is selectively connectable to the other of the output shaft or the input shaft.

In one embodiment of the apparatus, the first component includes a torque system, including one or more of a heat engine, a turbo machine, or an electric machine.

In another embodiment, the apparatus includes a housing surrounding the coupling assembly in which the housing surrounds at least a portion of the first component and a portion of the second component at which the coupling assembly is selectively connectable.

Yet another aspect of the present disclosure is directed to a torque system including a rotatable output shaft extended along a lateral direction, wherein the input shaft is connected to a turbine assembly, a rotatable input shaft extended along the lateral direction and is separable or spaced apart along the lateral direction from the output shaft, and a bearing assembly moveable along the lateral direction. The bearing assembly is connected to one of the input shaft or the output shaft, and further the bearing assembly is selectively connectable to the other of the input shaft or the output shaft.

In one embodiment, a coupling interface is defined at the portion of the input shaft and the portion of the output shaft at which the bearing assembly is selectively connectable. The coupling interface is defined at a bearing housing surrounding the bearing assembly at least at a portion of the input shaft and the output shaft corresponding to the coupling interface at the portion of the input shaft and the portion of the output shaft at which the bearing assembly is selectively connectable.

In another embodiment, the bearing assembly includes an inner race at which the coupling interface is defined, a rolling element configured to transfer loads along one or more of the lateral direction, a radial direction perpendicular to the lateral direction, or combinations thereof, and an outer race. The inner race, the outer race, and the rolling element are configured to displace together along the lateral direction relative to at least one of the input shaft or the output shaft.

In yet another embodiment, the torque system of further includes an actuation system connectable to the outer race of the bearing assembly configured to displace the bearing assembly along the lateral direction. The lateral displacement selectively connects the bearing assembly to both of the input shaft and the output shaft.

In various embodiments, the torque system further includes a gear assembly including the input shaft in which the gear assembly is selectively connectable to the output shaft via the bearing assembly. In one embodiment, the gear assembly defines an accessory gear assembly, a main gearbox, a power gearbox, a main rotor, a tail rotor, or a transmission assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
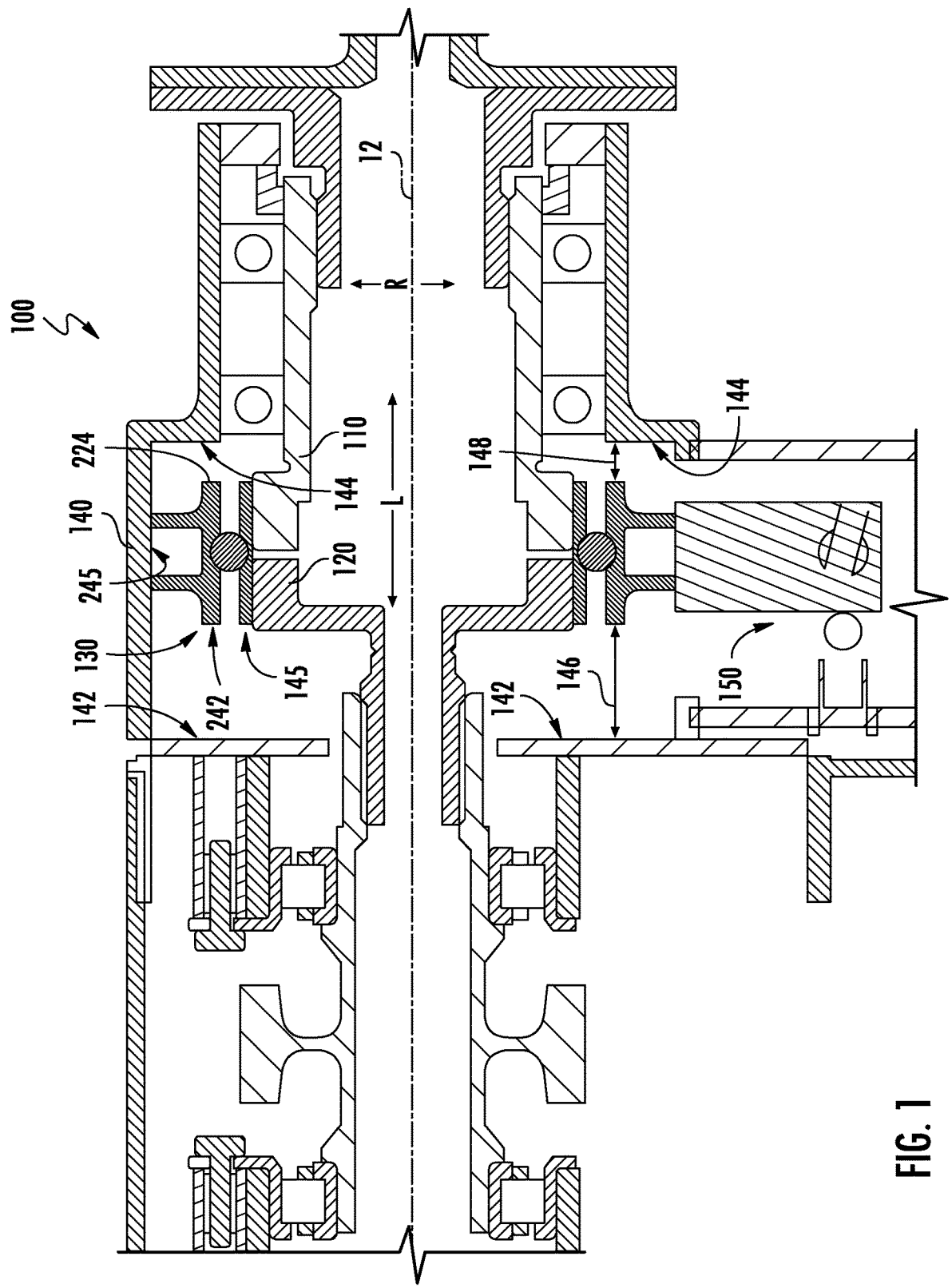
FIG. 1 is an exemplary schematic cross sectional view of an embodiment of a selectively connectable driveline system according to an aspect of the disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of a selectively connectable driveline system are provided herein may provide torque transmission via a selectively connectable coupling interface between two rotatable shafts such as to enable the system to run independently from a surrounding apparatus, and/or facilitate inspection and maintenance of the system and connecting components. Embodiments of the system provided herein provide sliding disconnection and connection between two or more components. The coupling assembly, such as a bearing assembly, may be integrated to the actuation system such as to mitigate wear and deterioration of the coupling assembly. Embodiments of the driveline system provided herein may further mitigate wear and deterioration over known selective engagement systems and connecting components via the coupling assembly positioned intermediate to the shafts in contrast to direct connections between shafts.

Referring now to the drawings, FIGS. 1-5 together provide exemplary cross sectional and perspective views of a selectively connectable driveline system 100 (hereinafter, "system 100"). The system 100 may be included in or in conjunction with a gear assembly and power system, such as, but not limited to, a reduction or power gear assembly, a propeller or fan gear assembly, an accessory gear assembly, a main gear assembly, a transfer gear assembly, or other gear assembly, examples and embodiments of which are further provided herein. Exemplary power systems to which the system 100 may selectively connect and transmit torque include turbo machine assemblies including, but not limited to, turbine engines, combustion engines, or electric machines, examples and embodiments of which are further provided herein.

The system 100 includes a first rotatable shaft 110 extended along a lateral direction L co-directional to an axial centerline axis 12. A second rotatable shaft 120 is extended along the lateral direction L. The second rotatable shaft 120 is separable or spaced apart along the lateral direction L from the first rotatable shaft 110. A coupling assembly 130 that is moveable along the lateral direction L is connected to the first rotatable shaft 110. The coupling assembly 130 is selectively connectable to the second rotatable shaft 120.

Figure 2:
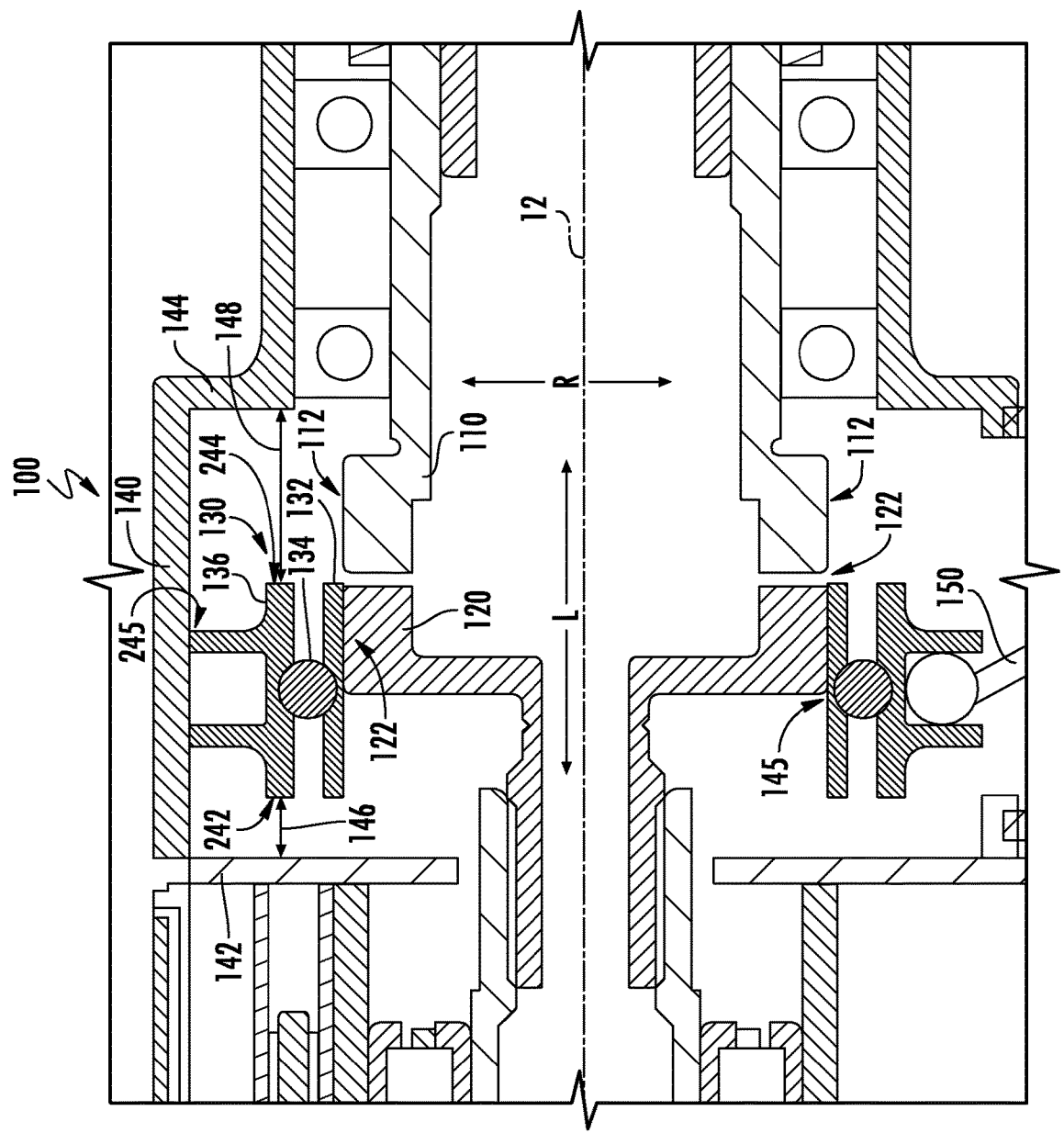
FIG. 2 is an exemplary schematic cross sectional view of the embodiment of the driveline system of FIG. 1 depicting a disengaged state according to an aspect of the disclosure.
Figure 3:
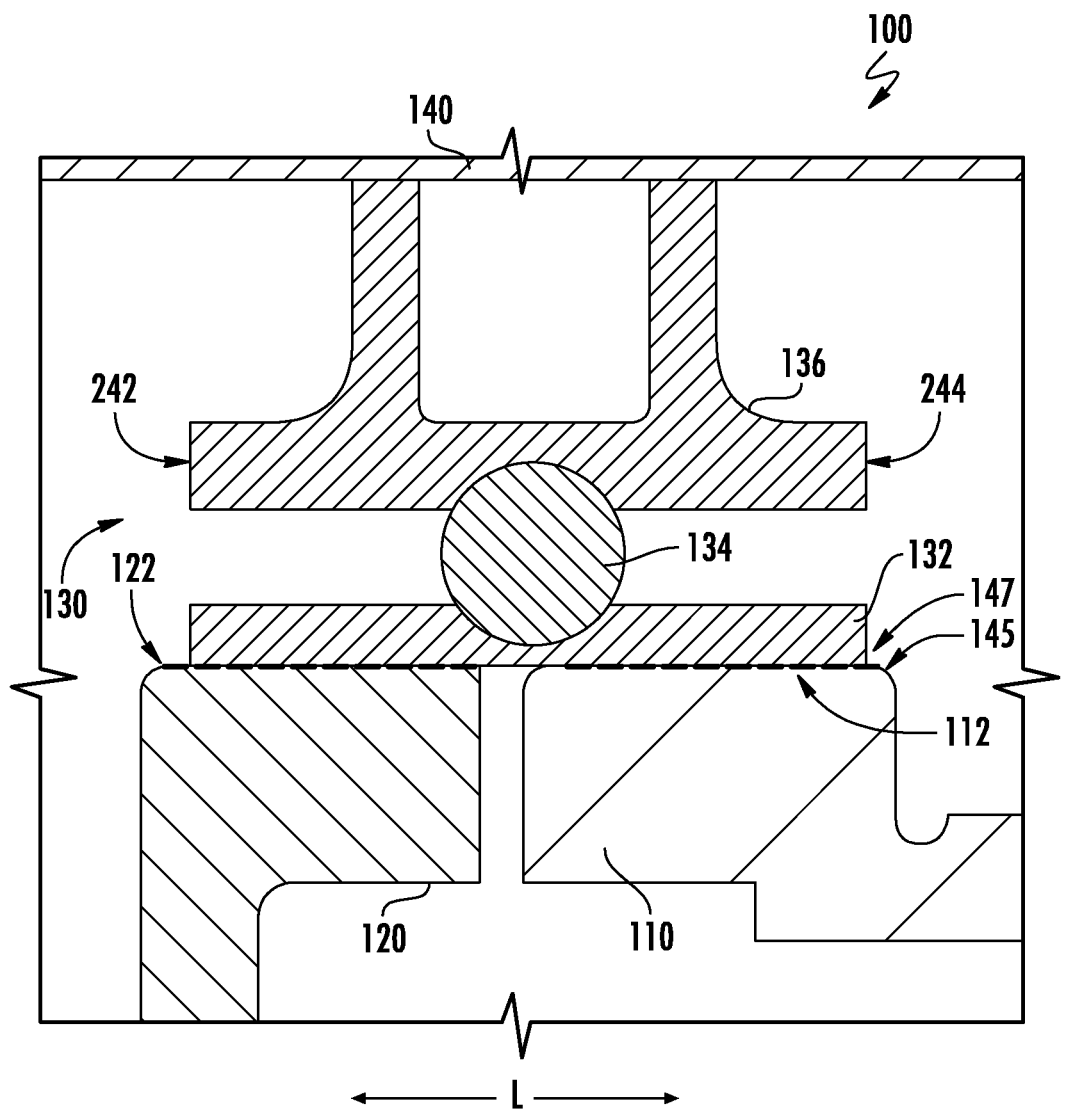
FIG. 3 is a detailed schematic cross sectional view of an exemplary portion of the driveline system of FIGS. 1-2.

A housing 140 surrounds the coupling assembly 130 at least at a portion 112 of the first rotatable shaft 110 and a portion 122 of the second rotatable shaft 120 at which the coupling assembly 130 is selectively connectable, such as further shown in detail in FIGS. 2-3. The housing 140 may generally define a fixed or static assembly to which the coupling assembly 130 is mounted. A coupling interface 145 is defined at the portion 112 of the first rotatable shaft 110 and the portion 122 of the second rotatable shaft 120 at which the coupling assembly 130 is selectively connectable.

In various embodiments, the coupling interface 145 defines a geared spline providing selective sliding motion the coupling assembly 130 along the lateral direction L from the first rotatable shaft 110 to the second rotatable shaft 120. In one embodiment, the portions 112, 122 of the respective first rotatable shaft 110 and the second rotatable shaft 120 define geared or externally geared features connectable to the coupling interface 145. In another embodiment, the geared spline at the portions 112, 122 defines a helical spline, such as to provide a lateral load at the stop wall 144.

In still various embodiments, the coupling interface 145 defines a keyway or key joint with the coupling assembly 130, in which the coupling assembly 130 and the shafts 110, 120 together define an opening or slot through which a corresponding portion of material selectively enters and exits via the lateral movement of the coupling assembly 130. In still another embodiment, the coupling interface 145 may define a single internal spline such as to provide torque transmission between the shafts 110, 120, lateral movement of the coupling assembly 130, while simplifying the selectively connectable interface. The selective connection and disconnection of the first rotatable shaft 110 and the second rotatable shaft 120 via the lateral sliding movement of the coupling assembly 130 provides torque transmission between the shafts 110, 120. As such, the system 100 may provide improved accessibility, ease of maintenance, disassembly, and assembly, decreased risk of component failure, or reduced cost of manufacturing or ownership.

In one embodiment, a housing interface 245 is further defined at which the housing 140 and the coupling assembly 130 are connected. The housing interface 245 may correspond to the coupling interface 145 at the portion 112 of the first rotatable shaft 110 and the portion 122 of the second rotatable shaft 120 at which the coupling assembly 130 is selectively connectable. In various embodiments, the housing interface 245 may define grooves, sliding surfaces, seals, or other features that provide lateral movement of the coupling assembly 130 relative to the housing 140. The housing interface 245 may generally correspond to the coupling interface 145 such as to provide torque transmission between the shafts 110, 120 and further provide selective movement of the coupling assembly 130 from the first rotatable shaft 110 to the second rotatable shaft 120. In various embodiments, the housing interface 245 provides a minimal clearance between the housing 140 and an outer race 136 when the shafts 110, 120 rotate with the driveline system 100 connected.

In still further embodiments, the coupling interface 145 defines an engagement end 147 at which the coupling assembly 130 initially connects to the first rotatable shaft 110 when selectively connected with the second rotatable shaft 120. The engagement end 147 may define a non-flat end of the coupling interface 145 such as to further facilitate selective engagement and disengagement of the shafts 110, 120 to one another. In one embodiment, the non-flat engagement end 147 of the coupling interface 145 defines an angular end. The angular end may define a substantially V- or U-shape extended along the lateral direction L. The coupling interface 145, the housing interface 245, and/or the shafts 110, 120 may define a single spline interface or key, or multiple splines, defining one or more tooth profiles, pitches, pressure angles, depths, or diameters suitable for lateral movement of the coupling assembly 130 and selective engagement and disengagement of the shafts 110, 120 relative to one another.

Figure 4A:
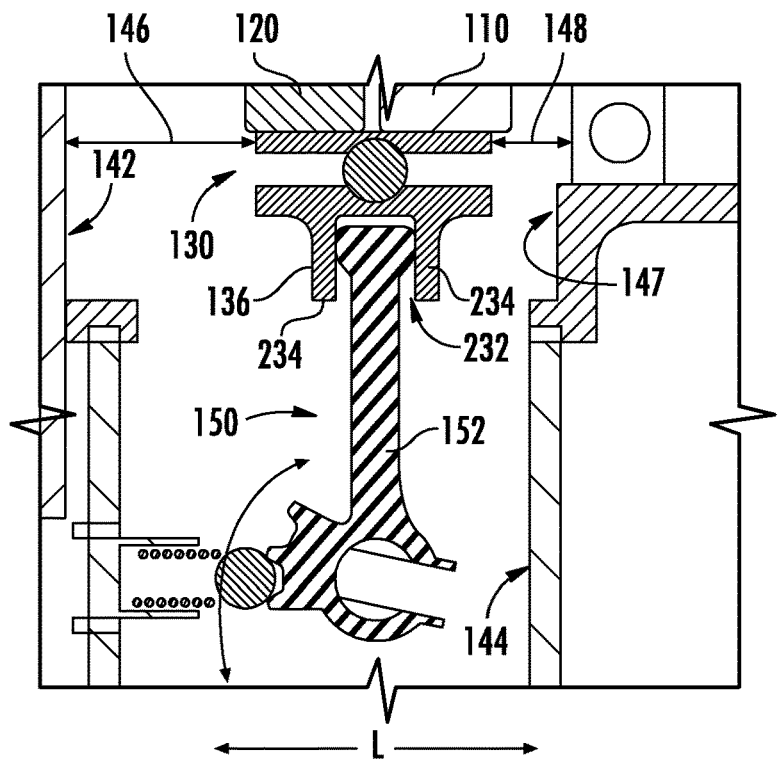
FIG. 4A is a detailed schematic cross sectional view of an exemplary portion of the driveline system depicting an engaged state.
Figure 4B:
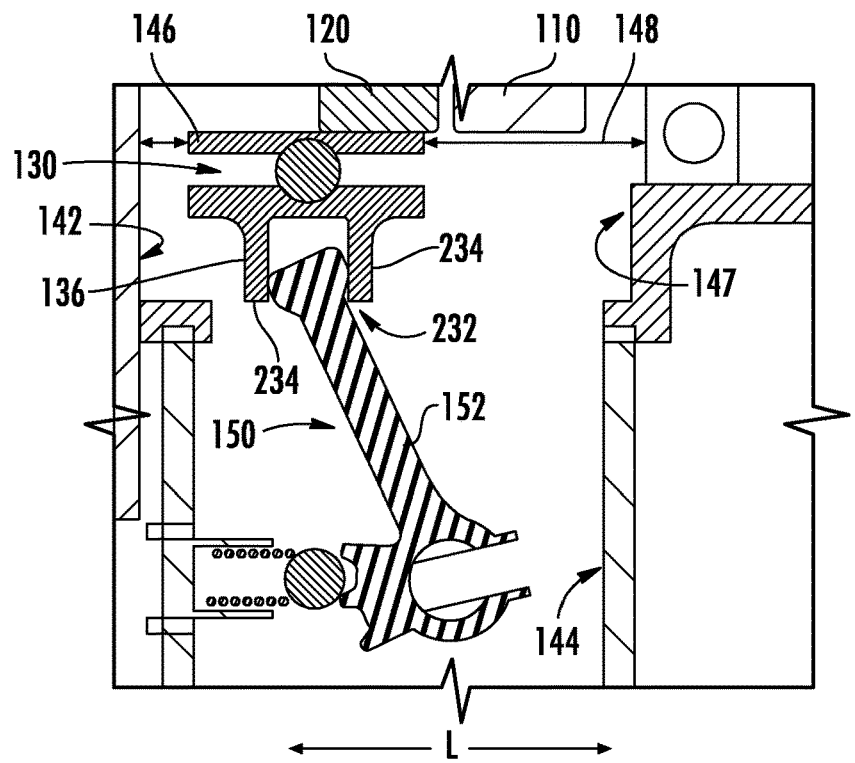
FIG. 4B is a detailed schematic cross sectional view of the exemplary portion of the driveline system of FIG. 4A depicting a disengaged state.

In still various embodiments, the engagement end 147 is an end stop system defining a maximum or final lateral movement position along lateral direction L of the coupling assembly 130. As such, the system 100 may provide nominal engagement overlap between the first rotatable shaft 110 and the second rotatable shaft 120. In one embodiment, the engagement end 147 is integrated into one or more of portions 112, 122, such as via the geared spline or tooth structure. In another embodiment, the engagement end 147 defining an end stop system is included at a stop wall 144 (FIG. 2, FIGS. 4A-4B). In yet another embodiment, the engagement end 147 defining an end stop system is included at an actuation system 150 (FIG. 2, FIGS. 4A-4B).

In various embodiments, the coupling assembly 130 defines a bearing assembly including an inner race, ring, or sleeve 132 (hereinafter, "inner race 132") at which the coupling interface 145 is defined at the coupling assembly 130 corresponding to the coupling interface 145 defined at the shafts 110, 120. The coupling assembly 130 further includes an outer race, ring, or sleeve 136 (hereinafter, "outer race 136"). In one embodiment, the outer race 136 is connectable to the housing 140 and is further connected to the coupling assembly 130. In one embodiment, the housing 140 may further define a bearing housing providing fixed or static support of the coupling assembly 130 along a radial direction R relative to the axial centerline axis 12. The housing 140 may further provide desirably constrained lateral movement of the coupling assembly 130 such as an end stop system described herein.

The coupling assembly 130 defining a bearing assembly may further include a rolling element 134 configured to transfer loads along one or more of the lateral direction L, the radial direction R perpendicular to the lateral direction L, or combinations thereof, such as along acute or oblique angles relative to the axial centerline axis 12, the lateral direction L, or the radial direction R. The inner race 132, the outer race 136, and the rolling element 134 are configured to displace together along the lateral direction L relative to at least one of the first rotatable shaft 110 or the second rotatable shaft 120.

In various embodiments, the rolling element 134 separates the outer race 136 and inner race 132. The rolling element 134 may mitigate wear between outer race 136 and the actuation system 150, such as wear due to sliding or lateral movement of the system 100. During operation of the system 100, the inner race 132 may rotate substantially similarly, such as at substantially the same speed, as the first rotatable shaft 110 and the second rotatable shaft 120. The rolling element 134 may compensate for differences in speed between the inner race 132 and the outer race 136. For example, the rolling element 134 reduces a difference in speed between the inner race 132 and the outer race 136. As another example, the rolling element 134 transmits loads along the lateral direction L, such as to provide a desired engagement position of the shafts 110, 120 and coupling assembly 130. As yet another example, the rolling element 134 may provide a desired engagement position of the shafts 110, 120 and the coupling assembly 130 during failure conditions of the actuation system 150.

The rolling element 134 may define a thrust or ball bearing configured to desirably transfer loads between the races 132, 136, the shafts 110, 120, the coupling assembly 130, or portions or combinations thereof, such as generally depicted in FIGS. 1-3 and FIGS. 4A-4B. In other embodiments, the rolling element 134 may define another suitable rolling element bearing type.

Figure 5:
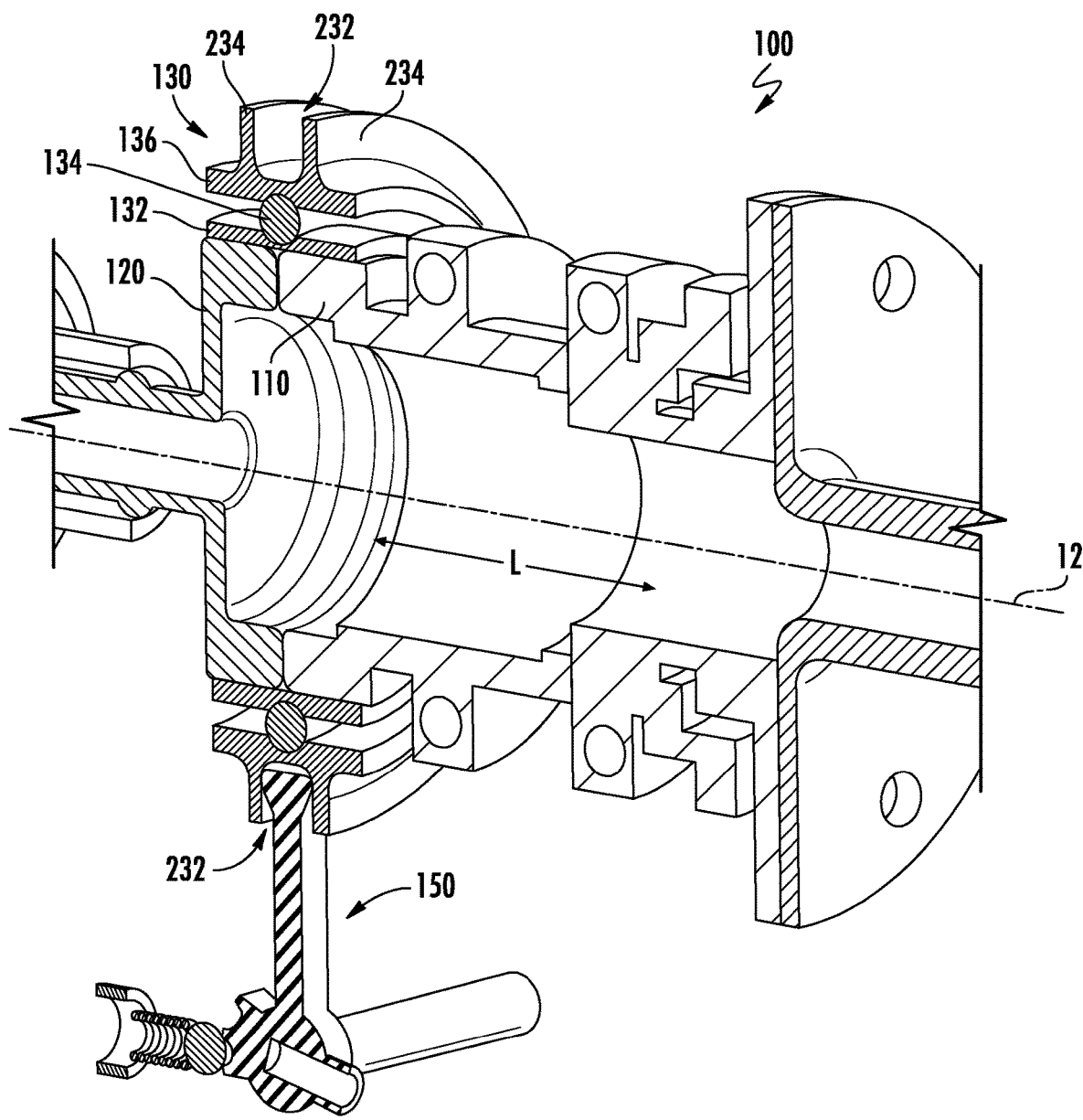
FIG. 5 is a perspective view of an exemplary embodiment of the driveline system according to aspects of the present disclosure.

Referring back to FIGS. 1-2, and further to FIGS. 4A-4B and FIG. 5, various embodiments of the system 100 further include an actuation system 150 connectable to the coupling assembly 130. The actuation system 150 is configured to provide lateral movement to the coupling assembly 130 sufficient to selectively connect the coupling assembly 130 to the first rotatable shaft 110 and the second rotatable shaft 120. In various embodiments, the actuation system 120 defines a mechanical actuation device, a hydraulic or pneumatic device, or an electromechanical device, such as, but not limited to, finger actuation, electrical motor, mechanical forks, or piston assemblies.

In various embodiments, such as depicted in regard to FIGS. 4A-4B, the actuation system 150 is connected or connectable to the outer race 136 of the coupling assembly 130. The coupling assembly 130 is configured such as to maintain the outer race 136, the inner race 132, and the rolling element 134 connected together as an assembly such as to displace together laterally via the actuation system 150. The outer race 136 may include a groove 232 defined by a pair of radially extended walls 234. The actuation system 150 may include an actuation arm 152 connected or connectable to the outer race 136 of the coupling assembly 130. The actuation arm 152 may more particularly engage the coupling assembly 130 within the groove 232, at which the actuation system 150 provides a motive force against the walls 234 to provide movement of the coupling assembly 130 along the lateral direction L. The actuation arm 152 may further engage the coupling assembly 130 and provide contact at the end stop wall 144 during an engagement phase of the shafts 110, 120 to one another, such as to define in part an end stop system such as described herein.

In various embodiments, the housing 140 includes a stop wall 142, 144 extended at least partially along the radial direction R. The stop wall 142, 144 is positioned adjacent or otherwise next to the coupling assembly 130 along the lateral direction L. Referring to FIGS. 1-2, the stop wall 142, 144 is separated from the coupling assembly 130 by a distance along the lateral direction L, such as depicted via arrows 146 and 148. The lateral distance 146, 148 is at least sufficient to allow movement of the coupling assembly 130 along the lateral direction L to selectively connect and disconnect the first rotatable shaft 110 and the second rotatable shaft 120 from one another.

In one embodiment, the housing 140 includes a first stop wall 142 positioned proximate, adjacent, or otherwise next to a first end 242 of the coupling assembly 130 along the lateral direction L. The housing 140 may further include a second stop wall 144 positioned proximate to a second end 244 of the coupling assembly 130 opposite of the first end 242 along the lateral direction L. A maximum lateral distance of the first stop wall 142 and the second stop wall 144 each correspond to a maximum lateral displacement of the coupling assembly 130 without disengaging from both of the first rotatable shaft 110 and the second rotatable shaft 120 (i.e., the stop wall 142, 144 prevents the coupling assembly 130 from disengaging one of the rotatable shafts 110, 120). A minimum lateral distance 146, 148 of at least one of the first stop wall 142 or the second stop wall 144 corresponds to a minimum lateral displacement of the coupling assembly 130 sufficient to engage both of the first rotatable shaft 110 and the second rotatable shaft 120 and provide sufficient torque transmission between the shafts 110, 120.

The lateral distance 146 between the first stop wall 142 and the coupling assembly 130 (i.e., the first end 242 of the coupling assembly 130) is such that the first stop wall 142 provides movement of the coupling assembly 130 along the lateral direction L from the engaged position (FIG. 1, FIG. 4A) to the disengaged position (FIG. 2, FIG. 4B) without allowing the coupling assembly to over-extend off of both shafts 110, 120 (i.e., the coupling assembly 130 remains connected to the second rotatable shaft 120 and disconnected from the first rotatable shaft 110, or in alternative embodiments the coupling assembly 130 remains connected the first rotatable shaft 110 and disconnected from the second rotatable shaft 120).

In various embodiments, the lateral distance 148 between the second stop wall 144 and the coupling assembly 130 (i.e., the second end 244 of the coupling assembly 130) is such that the second stop wall 144 disables over-extension of the coupling assembly 130 along the lateral direction L from the second rotatable shaft 120 when re-engaging the coupling assembly 130 from the second rotatable shaft 120 (FIG. 2, FIG. 4B) to both of the first rotatable shaft 110 and the second rotatable shaft 120 (FIG. 1, FIG. 4A).

Figure 6:
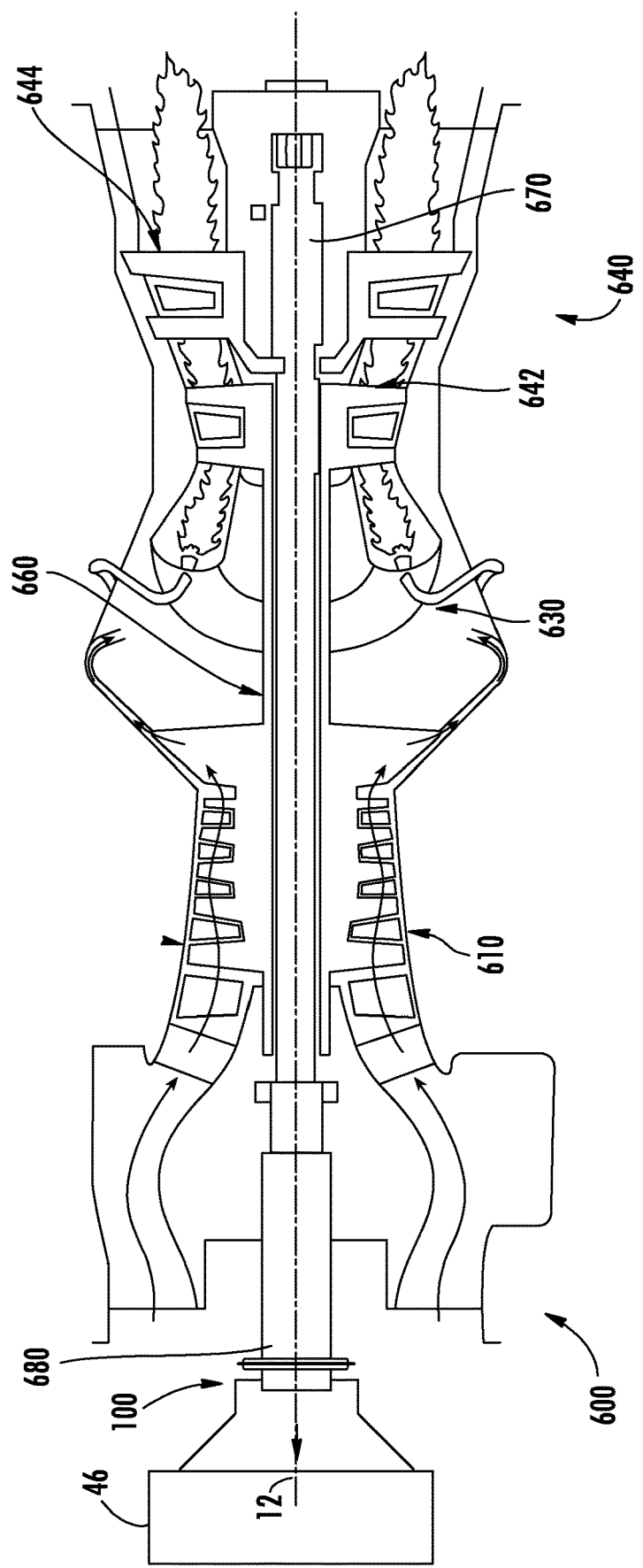
FIG. 6 is a schematic cross sectional view of an exemplary embodiment of a torque system according to an aspect of the present disclosure including an embodiment of the driveline system of FIGS. 1-5.

Referring now to FIG. 6, an exemplary schematic cross sectional view of a torque system 600 defining a turbine assembly or turbine engine (hereinafter, "torque system 600") including one or more embodiments of the driveline system 100 is provided. FIG. 6 generally depicts the torque system 600 defining a gas turbine engine selectively connectable to a gear assembly 46 via the system 100 such as shown and described in regard to FIGS. 1-5. Various embodiments of the torque system 600 may define turboshaft, turboprop, turbofan, propfan, or other turbo machine configurations. Still further embodiments may define the torque system 600 as a gas generator or other portion of a turbo machine configuration. However, it should be appreciated that still other embodiments of the torque system 600 may define a combustion engine (e.g., an internal combustion engine), an electric machine (e.g., generator, motor, or combinations thereof, etc.), or other device providing an output torque to an output shaft 680. In still various embodiments, the torque system 600 may define an energy system, such as an engine or other power generating apparatus or power output apparatus.

In various embodiments, the gear assembly 46 may define an accessory gearbox, such as to provide power to or receive power from one or more of a fluid pump (e.g., fuel, air, lubricant, hydraulic fluid, etc. pump or scavenge), heat exchanger, metering unit, an electric machine (e.g., a generator, motor, constant speed drive, etc.), a compressor (e.g., an air turbine starter), another gear assembly (e.g., an angle gearbox, a transfer gearbox, etc.) or other accessory units as may be incorporated to an accessory gearbox. In another embodiment, the gear assembly 46 may define a main gearbox configured to provide torque to rotate a gas generator for initial operation (e.g., startup and ignition). In other embodiments, the gear assembly 46 may define a reduction or power gearbox, such as transmit power and torque from the torque system 600 to a fan or propeller assembly, a main rotor (e.g., of a rotorcraft), a tail rotor (e.g., of a rotorcraft), or a transmission assembly, or a gear assembly for a power generating turbine engine (e.g., to convert output to 50 Hz or 60 Hz, etc.).

The torque system 600 defining a turbo machine may include a compressor section 610 and a turbine section 640 each drivingly connected to a gas generator shaft 660. The turbine section 640 may include a first turbine 642 drivingly connected to the gas generator shaft 660 and the compressor section 610. The first turbine 642 may define a high pressure turbine of the torque system 600 defining a turbo machine. An energy source 630, such as a heat engine generally, or a combustion section specifically, provides motive force to the turbine section 640, such as via combustion or detonation of a liquid, gaseous, or solid fuel, or via other methods of producing gases possessing energy that subsequently induces rotation of the turbine section 640. Rotation of the first turbine 642 drives rotation of the gas generator shaft 660 and the compressor section 610, thereby feeding relatively high pressure oxidizer to the energy source 630.

The torque system 600 may further include a power shaft 670 connected to one or more turbines of the turbine section 640. The turbine section 640 may further include a second turbine 644 drivingly connected to the power shaft 670. The second turbine 644 may define a low pressure turbine of the torque system 600 defining a turbo machine. The power shaft 670 is further drivingly connected to the output shaft 680. In various embodiments, the power shaft 670 and the output shaft 680 may define an integral component or assembly. The output shaft 680 depicted in regard to FIG. 6 may define or include the first rotatable shaft 110 shown and described in regard to FIGS. 1-5. The compressor section 610, turbine section 640, and shafts 660, 670, 680 may each be defined around the axial centerline axis 12 of the system 100 such as shown and described in regard to FIGS. 1-5. Additionally, or alternatively, the gear assembly 46 may be defined around the axial centerline axis 12. However, it should be appreciated that in other embodiments, the system 100 may be adapted to connect with the power shaft 670 at an acute angle relative to the axial centerline axis 12, or with a parallel offset relative to centerline axis 12 (e.g. through an additional gearbox attached to the power shaft 670).

Figure 7:
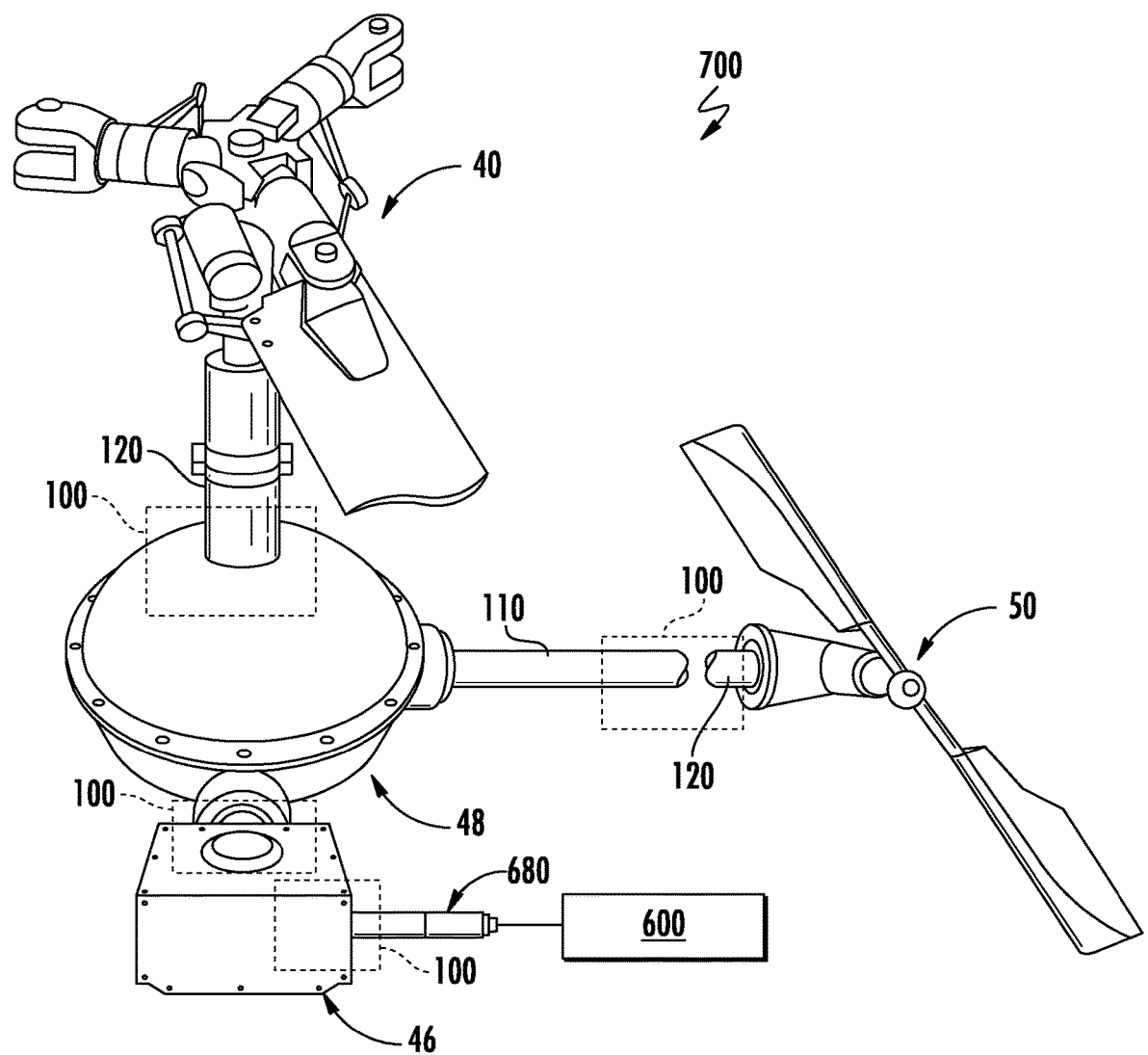
FIG. 7 is a schematic view of an exemplary embodiment of an apparatus including embodiments of the driveline system and torque system according to aspects of the present disclosure.

Referring now to FIG. 7, an exemplary schematic partial view of an apparatus 700 including the selectively connectable driveline system 100 is provided. The apparatus 700 may generally include any mechanical system or electromechanical system assembly in which a first rotatable shaft, such as from a first component, outputs power and torque to a second rotatable shaft of a second component at which power and torque is received. The system 100 may generally be defined at an interface or junction of a first component providing power or torque (i.e., the first component outputting power or torque) and a second component receiving power or torque (i.e., the second component receiving input power or torque from the first component).

The apparatus 700 may include embodiments or configurations of fixed wing aircraft, rotorcraft including high speed compound rotary-wing aircraft, rotary-wing aircraft with supplemental translational thrust systems, dual contra-rotating rotorcraft, coaxial rotor system aircraft, turboprop aircraft, tilt-rotor aircraft, tilt-wing aircraft, vertical takeoff and landing (VTOL) aircraft, short takeoff and vertical landing aircraft (STOVL), conventional takeoff and landing aircraft, or other aircraft systems, or turbine systems such as wind turbines or other fluid turbines. In various embodiments, FIG. 7 generally depicts interfaces at which the system 100 may be included, such as between the torque system 600 and the gear assembly 46, or between the gear assembly 46 and a transmission assembly 48, or between the transmission assembly 48 and a main rotor assembly 40 or a tail rotor assembly 50, or other combinations thereof of the first component outputting power and torque to the second component.

It should be appreciated that in various embodiments, the main rotor assembly 40 may define a main rotor for a rotorcraft, or in other embodiments, a fan or propeller for an aircraft or marine vehicle, a drivetrain for a land vehicle, or a rotor or turbine assembly for a wind turbine.

It should further be appreciated that combinations of the components of the apparatus 700 depicted in FIG. 7 may include the first rotatable shaft 110 and the second rotatable shaft 120 shown and described in regard to FIGS. 1-5. In various embodiments, the first rotatable shaft 110 defines or includes a rotatable output shaft of a first assembly and the second rotatable shaft 120 defines or includes a rotatable input shaft of a second assembly. In one embodiment, the torque system 600 provides the output shaft and includes the first rotatable shaft 110 shown and described in regard to FIGS. 1-5. The gear assembly 46 may further include the input shaft defining the second rotatable shaft 120 shown and described in regard to FIGS. 1-5. As such, the torque system 600 outputs to the gear assembly 46 power or torque that is input to the gear assembly 46 for operation thereof.

In another embodiment, the gear assembly 46 provides the output shaft including the first rotatable shaft 110 shown and described in regard to FIGS. 1-5. The transmission assembly 48 may further include the input shaft including the second rotatable shaft 120 shown and described in regard to FIGS. 1-5. As such, the gear assembly 46 outputs to the transmission assembly 48 power or torque that is input to the transmission assembly 48 for operation thereof.

In various embodiments, the transmission assembly 48 provides the output shaft including the first rotatable shaft 110 and the main rotor assembly 40 includes the input shaft including the second rotatable shaft 120 shown and described in regard to FIGS. 1-5. As such, the transmission assembly 48 outputs to the main rotor assembly 40 power or torque that is input to the main rotor assembly 40 for operation thereof. In another embodiment, the transmission assembly 48 provides the output shaft including the first rotatable shaft 110 and the tail rotor assembly 50 includes the input shaft including the second rotatable shaft 120 shown and described in regard to FIGS. 1-5. As such, the transmission assembly 48 outputs to the tail rotor assembly 50 power or torque that is input to the tail rotor assembly 50 for operation thereof.

Embodiments of the system 100, torque system 600, and apparatus 700 provided herein may be formed of one or more processes, such as, but not limited to, additive manufacturing or 3D printing, casting, forging, bonding, or machining processes, including material additive or material removal processes generally, appropriate for producing gears, gear assemblies, splines, couplings, bearings, bearing surfaces, etc.

Embodiments of the system 100 provided herein may provide an improved system for torque transmission and selective engagement and disengagement between components in contrast to known systems. The system 100 may provide torque transmission via the coupling interface, such as a geared spline interface, or a single geared spline, such as to provide sliding disconnection and connection between two or more components. The coupling assembly, such as a bearing assembly, may be integrated to the actuation system such as to mitigate wear and deterioration of the coupling assembly. Embodiments of the system 100 provided herein may further mitigate wear and deterioration over known selective engagement systems and connecting components via the coupling assembly positioned intermediate to the shafts in contrast to direct connections between shafts. Wear or deterioration may further be limited to the coupling assembly, or an inner sleeve or race thereof, thereby decreasing maintenance costs and failure risks. The system 100 may further improve integration, changing, or replacement of components in mechanical or electromechanical apparatuses. The system 100 may reduce costs associated with manufacturing, maintenance, inspection, or cost of ownership of the apparatus or torque system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following Clauses 1-32:

1. A driveline system comprising a first rotatable shaft extended along a lateral direction, a second rotatable shaft extended along the lateral direction, wherein the second rotatable shaft is separable along the lateral direction from the first rotatable shaft, and a coupling assembly moveable along the lateral direction, wherein the coupling assembly is connected to the first rotatable shaft, and further wherein the coupling assembly is selectively connectable to the second rotatable shaft.

2. The system of any preceding clause, wherein a coupling interface is defined at the portion of the first rotatable shaft and the portion of the second rotatable shaft at which the coupling assembly is selectively connectable.

3. The system of any preceding clause, wherein the coupling interface defines an engagement end at which the coupling assembly initially connects to the second rotatable shaft when selectively connected together, and wherein the engagement end defines a non-flat end of the coupling interface.

4. The system of any preceding clause, wherein the non-flat end of the coupling interface defines an angular end.

5. The system of any preceding clause, further comprising an actuation system connectable to the coupling assembly, wherein the actuation system is configured to provide lateral movement to the coupling assembly, and wherein the lateral movement is sufficient to selectively connect the coupling assembly to the first rotatable shaft and the second rotatable shaft.

6. The system of any preceding clause, further comprising a housing surrounding the coupling assembly, wherein the housing surrounds at least a portion of the first rotatable shaft and a portion of the second rotatable shaft at which the coupling assembly is selectively connectable.

7. The system of any preceding clause, wherein the housing comprises a stop wall extended at least partially radially relative to the laterally extended rotatable shafts, and wherein the stop wall is positioned laterally next to the coupling assembly, the stop wall separated from the coupling assembly by a lateral distance corresponding at least to a distance sufficient to allow lateral movement of the coupling assembly to selectively connect to the first rotatable shaft and the second rotatable shaft.

8. The system of any preceding clause, wherein the stop wall of the housing comprises a first stop wall positioned next to a first end of the coupling assembly and a second stop wall positioned next to a second end of the coupling assembly laterally opposite of the first end, wherein the a maximum lateral distance of the first stop wall and the second stop wall each correspond to a maximum lateral displacement of the coupling assembly without disengaging from both of the first rotatable shaft and the second rotatable shaft.

9. The system of any preceding clause, wherein a minimum lateral distance of at least one of the first stop wall or the second stop wall corresponds to a minimum lateral displacement of the coupling assembly sufficient to engage both of the first rotatable shaft and the second rotatable shaft.

10. The system of any preceding clause, wherein the coupling interface defines a geared spline.

11. The system of any preceding clause, wherein the coupling interface defines a single geared spline or key joint.

12. An apparatus comprising a first component providing torque via an output shaft, a second component receiving torque via an input shaft, and a coupling assembly moveable along a lateral direction, wherein the coupling assembly is connected to one of the output shaft or the input shaft, and further wherein the coupling assembly is selectively connectable to the other of the output shaft or the input shaft.

13. The apparatus of any preceding clause, wherein the first component comprises a torque system, wherein the torque system comprises one or more of a heat engine, a turbo machine, or an electric machine.

14. The apparatus of any preceding clause, further comprising a housing surrounding the coupling assembly, wherein the housing surrounds at least a portion of the first component and a portion of the second component at which the coupling assembly is selectively connectable.

15. The apparatus of any preceding clause, wherein the apparatus includes one or more of a fixed wing aircraft, rotorcraft, high speed compound rotary-wing aircraft, rotary-wing aircraft with supplemental translational thrust systems, dual contra-rotating rotorcraft, coaxial rotor system aircraft, turboprop aircraft, tilt-rotor aircraft, tilt-wing aircraft, vertical takeoff and landing (VTOL) aircraft, short takeoff and vertical landing aircraft (STOVL), conventional takeoff and landing aircraft, or a wind turbine, or a fluid turbine.

16. A torque system comprising a rotatable output shaft extended along a lateral direction, wherein the input shaft is connected to a turbine assembly, a rotatable input shaft extended along the lateral direction, wherein the input shaft is separable or spaced apart along the lateral direction from the output shaft, and a bearing assembly moveable along the lateral direction, wherein the bearing assembly is connected to one of the input shaft or the output shaft, and further wherein the bearing assembly is selectively connectable to the other of the input shaft or the output shaft.

17. The torque system of any preceding clause, wherein a coupling interface is defined at the portion of the input shaft and the portion of the output shaft at which the bearing assembly is selectively connectable, and further wherein the coupling interface is defined at a bearing housing surrounding the bearing assembly at least at a portion of the input shaft and the output shaft corresponding to the coupling interface at the portion of the input shaft and the portion of the output shaft at which the bearing assembly is selectively connectable.

18. The torque system of any preceding clause, wherein the bearing assembly comprises an inner race at which the coupling interface is defined, a rolling element configured to transfer loads along one or more of the lateral direction, a radial direction perpendicular to the lateral direction, or combinations thereof, and an outer race, wherein the inner race, the outer race, and the rolling element are configured to displace together along the lateral direction relative to at least one of the input shaft or the output shaft.

19. The torque system of any preceding clause, further comprising an actuation system connectable to the outer race of the bearing assembly, wherein the actuation system is configured to displace the bearing assembly along the lateral direction, and wherein the lateral displacement selectively connects the bearing assembly to both of the input shaft and the output shaft.

20. The torque system of any preceding clause, further comprising a gear assembly comprising the input shaft, wherein the gear assembly is selectively connectable to the output shaft via the bearing assembly.

21. The torque system of any preceding clause, wherein the gear assembly comprises an accessory gear assembly, a main gearbox, a power gearbox, a main rotor, a tail rotor, or a transmission assembly.

22. The torque system of any preceding clause, wherein the bearing assembly includes an engagement end at which the bearing assembly initially connects to the input shaft or the output shaft when selectively connected together.

23. The torque system of any preceding clause, wherein the engagement end defines a non-flat end of the coupling interface.

24. The torque system of any preceding clause, wherein the non-flat end of the coupling interface defines an angular end.

25. The torque system of any preceding clause, further including a housing surrounding the bearing assembly, wherein the housing surrounds at least a portion of the input shaft and at least a portion of the output shaft at which the bearing assembly is selectively connectable.

26. The torque system of any preceding clause, wherein the housing comprises a stop wall extended at least partially radially relative to the input shaft and the output shaft, and wherein the stop wall is positioned laterally next to the bearing assembly, the stop wall separated from the bearing assembly by a lateral distance corresponding at least to a distance sufficient to allow lateral movement of the bearing assembly to selectively connect to the input shaft and the output shaft.

27. The torque system of any preceding clause, wherein the stop wall of the housing comprises a first stop wall positioned next to a first end of the bearing assembly and a second stop wall positioned next to a second end of the bearing assembly laterally opposite of the first end, wherein the a maximum lateral distance of the first stop wall and the second stop wall each correspond to a maximum lateral displacement of the bearing assembly without disengaging from both of the input and the output shaft.

28. The torque system of any preceding clause, wherein a minimum lateral distance of at least one of the first stop wall or the second stop wall corresponds to a minimum lateral displacement of the bearing assembly to engage both of the input shaft and the output shaft.

29. The torque system of any preceding clause, wherein the inner race defines a geared spline.

30. The torque system of any preceding clause, wherein the inner race defines a key joint or a single geared spline.

31. The torque system of any preceding clause, wherein the torque system includes a turbo machine, the turbo machine including a compressor section and a turbine section each drivingly connected to a gas generator shaft.

32. The apparatus of any preceding clause, wherein the system of any preceding clause is included between the torque system of any preceding clause and a gear assembly, or between the gear assembly and a transmission assembly, or between the transmission assembly and a main rotor assembly or a tail rotor assembly, or combinations thereof of the first rotatable shaft outputting power and torque to the second rotatable shaft.

What is claimed is:

1. A driveline system, the driveline system comprising:
a housing;
a first rotatable shaft extended along a lateral direction;
a second rotatable shaft extended along the lateral direction, wherein the second rotatable shaft is separable along the lateral direction from the first rotatable shaft; and
a coupling assembly moveable along the lateral direction within the housing, wherein the coupling assembly is connected to the first rotatable shaft, and further wherein the coupling assembly is selectively connectable to the second rotatable shaft,
wherein the coupling assembly comprises:
an inner race configured to contact and couple with the first rotatable shaft and configured to selectively contact and couple to the second rotatable shaft,
an outer race abutting and in contact with the housing, the outer race being moveable within the housing, and
a rolling element provided between the inner race and the outer race,
wherein the inner race, the outer race, and the rolling element are configured to displace together along the lateral direction relative to at least one of the first rotatable shaft or the second rotatable shaft, and wherein the inner race and the outer race are free to move relative to each other in the lateral direction.

2. The driveline system of claim 1, wherein a coupling interface of the coupling assembly is defined at a portion of the first rotatable shaft, and at a portion of the second rotatable shaft at which the coupling assembly is selectively connectable.

3. The driveline system of claim 2, wherein the coupling interface of the coupling assembly comprises an engagement end at which the coupling assembly initially connects to the first rotatable shaft while selectively connected to the second rotatable shaft, and wherein the engagement end of the coupling interface of the coupling assembly has a non-flat end.

4. The driveline system of claim 3, wherein the non-flat end of the coupling interface defines an angular end.

5. The driveline system of claim 1, further comprising:
an actuation system connectable to the coupling assembly, wherein the actuation system is configured to provide lateral movement to the coupling assembly, and wherein the lateral movement is sufficient to selectively connect the coupling assembly to the first rotatable shaft and the second rotatable shaft.

6. The driveline system of claim 1, wherein the housing surrounds the coupling assembly, wherein the housing surrounds at least a portion of the first rotatable shaft and a portion of the second rotatable shaft at which the coupling assembly is selectively connectable.

7. The driveline system of claim 6, wherein the housing comprises a stop wall extended at least partially radially relative to the first rotatable shaft and the second rotatable shaft, and wherein the stop wall is positioned laterally next to the coupling assembly, the stop wall separated from the coupling assembly by a lateral distance corresponding at least to a distance sufficient to allow lateral movement of the coupling assembly to selectively connect to the first rotatable shaft and the second rotatable shaft.

8. The driveline system of claim 1, wherein the housing comprises a first stop wall positioned next to a first end of the coupling assembly and a second stop wall positioned next to a second end of the coupling assembly laterally opposite of the first end, wherein a maximum lateral distance of the first stop wall and the second stop wall each correspond to a maximum lateral displacement of the coupling assembly without disengaging from both of the first rotatable shaft and the second rotatable shaft.

9. The driveline system of claim 8, wherein a minimum lateral distance of at least one of the first stop wall or the second stop wall corresponds to a minimum lateral displacement of the coupling assembly to engage both of the first rotatable shaft and the second rotatable shaft.

10. The driveline system of claim 2, wherein the coupling interface defines a geared spline.

11. The driveline system of claim 2, wherein the coupling interface defines a key joint or a single geared spline.

12. An apparatus, the apparatus comprising:
a housing;
a first component providing torque via an output shaft;
a second component receiving torque via an input shaft; and
a coupling assembly moveable along a lateral direction within the housing, wherein the coupling assembly is connected to one of the output shaft or the input shaft, and further wherein the coupling assembly is selectively connectable to the other of the output shaft or the input shaft,
wherein the coupling assembly comprises:
an inner race configured to contact and couple with the input shaft or the output shaft and configured to selectively couple to the input shaft or the output shaft,
an outer race abutting and in contact with the housing, the outer race being moveable within the housing, and
a rolling element provided between the inner race and the outer race,
wherein the inner race, the outer race, and the rolling element are configured to displace together along the lateral direction relative to at least one of the input shaft or the output shaft, and wherein the inner race and the outer race are free to move relative to each other in the lateral direction.

13. The apparatus of claim 12, wherein the first component comprises a torque system, wherein the torque system comprises one or more of a heat engine, a turbo machine, or an electric machine.

14. The apparatus of claim 12, wherein the housing surrounds the coupling assembly, wherein the housing surrounds at least a portion of the first component and a portion of the second component at which the coupling assembly is selectively connectable.

15. A torque system, the torque system comprising:
a housing;
a rotatable output shaft extended along a lateral direction, wherein the rotatable output shaft is connected to a turbine assembly;
a rotatable input shaft extended along the lateral direction, wherein the rotatable input shaft is separable along the lateral direction from the rotatable output shaft; and
a bearing assembly moveable along the lateral direction, wherein the bearing assembly is connected to one of the rotatable input shaft or the rotatable output shaft, and further wherein the bearing assembly is selectively connectable to the other of the rotatable input shaft or the rotatable output shaft,
wherein the bearing assembly comprises:
an inner race configured to contact and couple with the rotatable input shaft or the rotatable output shaft and configured to selectively couple to the rotatable input shaft or the rotatable output shaft,
an outer race abutting and in contact with the housing, the outer race being moveable within the housing, and
a rolling element provided between the inner race and the outer race,
wherein the inner race, the outer race, and the rolling element are configured to displace together along the lateral direction relative to at least one of the rotatable input shaft or the rotatable output shaft, and wherein the inner race and the outer race are free to move relative to each other in the lateral direction.

16. The torque system of claim 15, wherein a coupling interface is defined at a portion of the rotatable input shaft and a portion of the rotatable output shaft at which the bearing assembly is selectively connectable, and further wherein the coupling interface is defined at a bearing housing surrounding the bearing assembly at least at a portion of the rotatable input shaft and the rotatable output shaft corresponding to the coupling interface at the portion of the rotatable input shaft and the portion of the rotatable output shaft at which the bearing assembly is selectively connectable.

17. The torque system of claim 15, wherein
the rolling element configured to transfer loads along one or more of the lateral direction, a radial direction perpendicular to the lateral direction, or combinations thereof.

18. The torque system of claim 17, further comprising:
an actuation system connectable to the outer race of the bearing assembly, wherein the actuation system is configured to displace the bearing assembly along the lateral direction to provide a lateral displacement, and wherein the lateral displacement selectively connects the bearing assembly to both the rotatable input shaft and the rotatable output shaft.

19. The torque system of claim 15, further comprising:
a gear assembly comprising the rotatable input shaft, wherein the gear assembly is selectively connectable to the rotatable output shaft via the bearing assembly.

20. The torque system of claim 19, wherein the gear assembly comprises an accessory gear assembly, a main gearbox, a power gearbox, a main rotor, a tail rotor, or a transmission assembly.

* * * * *